US005720797A

United States Patent [19]
Yates et al.

[11] Patent Number: 5,720,797
[45] Date of Patent: Feb. 24, 1998

[54] PROCESS FOR RECOVERING SULFUR HEXAFLUORIDE

[75] Inventors: Stephen Frederic Yates, Arlington Heights; Romulus Gaita, Morton Grove; Amar Ramachandra, Bensenville; Robert Morrell, Des Plaines, all of Ill.

[73] Assignee: AlliedSignal Inc., Morristown, N.J.

[21] Appl. No.: 769,022

[22] Filed: Dec. 18, 1996

[51] Int. Cl.$^6$ ............................................. B01D 53/047
[52] U.S. Cl. ...................... 95/96; 95/103; 95/131; 95/135
[58] Field of Search ............................. 95/95, 96, 103, 95/131, 135, 148; 423/240 R, 244.01

[56] References Cited

U.S. PATENT DOCUMENTS 3,675,392  7/1972  Reighter .................... 95/131 X

FOREIGN PATENT DOCUMENTS

| 3036504 | 4/1982 | Germany | 95/135 |
| 47-006205 | 2/1972 | Japan | 95/131 |
| 06-047233 | 2/1994 | Japan | 95/131 |

*Primary Examiner*—Robert Spitzer
*Attorney, Agent, or Firm*—Lois A. Gianneschi

[57] ABSTRACT

The present invention relates to a process for recovering sulfur hexafluoride ("$SF_6$"). More specifically, the invention provides a pressure swing adsorption—desorption process for recovering $SF_6$ from a gas stream using zeolites, activated carbons, or silicalites to adsorb the $SF_6$.

25 Claims, No Drawings

5,720,797

PROCESS FOR RECOVERING SULFUR HEXAFLUORIDE

FIELD OF THE INVENTION

The present invention relates to a process for recovering sulfur hexafluoride ("$SF_6$"). More specifically, the invention provides a pressure swing adsorption—desorption process for recovering $SF_6$ from a gas stream.

BACKGROUND OF THE INVENTION $SF_6$, a non-flammable gas used in industry in a variety of applications, is manufactured by any of a number of known processes. In its manufacture, the product $SF_6$ typically must be treated to remove impurities. In so treating the product $SF_6$, some $SF_6$ may be lost as one component of a gaseous stream of the impurities removed from the product $SF_6$. The gas stream containing the impurities and some $SF_6$ may be vented to the atmosphere. Not only does this result in loss of some of the $SF_6$ produced, but it is environmentally undesirable because $SF_6$ is suspected of being a "green-house", global warming gas.

A number of processes for separating $SF_6$ from other gases are known. J. J. Perona and J. S. Watson in "Sulfur Hexafluoride Purification From Mixtures With Air: A Process Feasibility Study" disclose the adsorption of $SF_6$ from an air-$SF_6$ mixture using activated carbon and temperatures below −50° F. This process is disadvantageous because it is an energy-intensive process.

In C. Brassard, *Proceedings of the Symposium of Northeast Accelerator Personnel (S.N.E.A.P.)*, 60 (1976), a process for recovering $SF_6$ using activated charcoal adsorption is disclosed. In this process, short bursts of gas are admitted to a column and the impurities, traveling at a faster rate than the $SF_6$, exit before the $SF_6$. This method is disadvantageous because it is impractical for use in industry.

Further, U.S. Pat. No. 3,675,392 discloses the use of molecular sieves to separate water and carbon dioxide from $SF_6$. However, the process disclosed in this patent is a batch process and suitable only for gas streams in which $SF_6$ is the major component. Finally, Japanese Patent Application No. 60-054723 discloses the removal of water and carbon dioxide from $SF_6$ using calcium hydride. This process is disadvantageous because calcium hydride is a dangerous material and has a relatively low capacity for removal of water and carbon dioxide.

None of the foregoing methods provide an industrial useful method for recovering SF6 from a gas stream in which $SF_6$ is a minor component. Therefore, a need exists for a cost-effective, efficient, industrial useful method for recovering $SF_6$.

DESCRIPTION OF THE INVENTION AND ITS PREFERRED EMBODIMENTS

The invention provides a simple, economical method for recovering $SF_6$ from a gas stream. The process of the invention comprises contacting a gas stream comprising a minor amount of $SF_6$ with an adsorbent capable of selectively adsorbing $SF_6$ under conditions suitable for the selective adsorption of $SF_6$ from the gas stream. Optionally, the process additionally comprises regenerating $SF_6$ from the adsorbent.

The gas streams useful in the invention contain a minor amount of $SF_6$ along with at least one other component. By "minor amount" is meant less than about 50 volume percent, preferably less than about 20 volume percent, more preferably about 1 volume percent $SF_6$ based on the total volume of the gas stream.

The other component of the gas stream may be one or more non-condensible gases. The component typically will be one or more of air, helium, argon, carbon monoxide, carbon dioxide, nitrogen, oxygen, neon, hydrogen, or carbon tetrafluoride. The process may find its greatest utility for gas streams in which carbon tetrafluoride is the other component or one of the other components.

Adsorbents useful in this invention are any adsorbents capable of selectively adsorbing $SF_6$. By "selectively adsorbing" is meant that the adsorbent has an affinity for $SF_6$ that is greater than its affinity for the other component or components in the gas stream. Preferably, the adsorbent has an affinity for $SF_6$ such that $SF_6$ is substantially entirely adsorbed from the gas stream while little or none of the other component or components is adsorbed. Suitable adsorbents useful in the invention are commercially available. Examples of useful adsorbents include, without limitation, zeolites, activated carbons, and silicalite. Preferably, zeolites or activated carbons are used. More preferably, activated carbons are used as the adsorbent.

Zeolites that may be used in the process of the invention are natural or synthetic zeolites with mean pore sizes of greater than about 5, preferably from about 5 to about 20 Å. Preferably, the zeolite used is X or Y Faujasite zeolite. More preferably, sodium X (13×) zeolite is used.

Activated carbons useful in the invention are any of the granular, activated carbons with a mesh of from about 4 to about 300, preferably from about 20 to about 50. In terms of surface area, the activated carbon has a surface area of at least about 200 $m^2/g$, preferably from about 1000 to about 1500 $m^2/g$. Preferably, the activated carbon is PCB™ or ASC™ carbon available from Calgon Corp.

The amount of adsorbent used is an amount effective to allow the adsorption cycle to run for the period desired before regeneration of the adsorbent is necessary. The precise amount of adsorbent used will be readily determinable by one ordinarily skilled in the art by considering the chosen adsorbent's capacity, the desired time period between adsorbent regenerations, and the flow rate of the $SF_6$ gas stream.

Contacting of the gas stream and adsorbents may take place in any manner known in the art. Preferably, contacting takes place by passing the gas stream through a fixed, packed bed of adsorbent. Passage of the gas stream takes place at a gas hourly space velocity of less than about 240, preferably less than about 100, $h^{-1}$.

The contacting is performed under any conditions such that the selective adsorption of $SF_6$ from the gas stream is facilitated. Accordingly, the temperature and pressure for contacting will be such that the temperature is greater, preferably about 10° C. greater, than the boiling point of $SF_6$ for the contacting pressure. Preferably, contacting is performed at a temperature of from about 10° to about 40° C., preferably from about 25° to about 40° C. Most preferably, contacting is performed at room temperature. The pressure at which contacting is carried out is at least about 5,170 torr (100 psia), preferably at least about 10,340 torr (200 psia).

$SF_6$ adsorbed in the contacting step may be regenerated from the adsorbent by any convenient manner. Preferably, the regeneration is performed by lowering the pressure to about 760 torr (14.7 psia), more preferably to about 100 torr (1.93 psia), most preferably to about 40 torr (0.77 psia) over the adsorbent bed releasing the $SF_6$ so that it may be collected. The regeneration so performed may take place at temperatures of at least about 10° C., preferably at least about 25° C. The time necessary to regenerate the $SF_6$ will depend on the amount of $SF_6$ adsorbed on the adsorbent as well as the amount of adsorbent used. Generally, regeneration will take place in from about 5 to about 40 hours.

The process of the invention may be used to recover $SF_6$ from any gas stream, but may find its greatest utility in recovering $SF_6$ from gas streams in which the $SF_6$ is present in a minor amount. For example, in the manufacture of $SF_6$, the $SF_6$ produced is typically distilled and purified $SF_6$ is removed as the column bottoms stream. The column overhead stream will contain a minor amount of $SF_6$ as well as other components. SF6 may be recovered from the overhead stream by using the process of the invention.

The process of the invention may be carried out using any suitable vessel. For example, a chromatography column with pipe fittings on either end. Preferably, more than one vessel is used so that regeneration of the adsorbent in one column may be carried out without interruption of the $SF_6$ recovery.

The invention will be clarified further by the following, non-limiting examples.

EXAMPLES

Example 1

A 500 mL (14 in×1.814 in i.d.) column was filled with 275 g dry 13× zeolite available from UOP Inc. A feed stream, prepared by mixing a stream of air flowing at 400 mL/min and a stream of $SF_6$ contaminated with 0.091% carbon tetrafluoride flowing at 100 mL/min, was allowed to pass through the column at 25° C. The pressure in the column was adjusted to approximately 248–265 psia. Samples of the gas stream exiting the column were taken periodically and analyzed by gas chromatography. The concentration of $SF_6$ and $CF_4$ obtained by the analysis are shown on Table 1. The capacity of the adsorbent for $SF_6$ was calculated from the time required for the $SF_6$ concentration to reach 50% of the feed concentration.

TABLE 1

| Time (min) | $[CF_4]^1$ | $[SF_6]^2$ |
|---|---|---|
| Feed | 0.091 | 18.39 |
| 13 | 0 | 0.8 |
| 27 | 0 | 0.48 |
| 42 | 0 | 0.24 |
| 59 | 0 | 0.23 |
| 74 | 0 | 0.19 |
| 89 | 0 | 0.17 |
| 103 | 0 | 0.21 |
| 117 | 0 | 0.19 |
| 131 | 0 | 0.18 |
| 145 | 0.17 | 0.2 |
| 163 | 0.657 | 0.17 |
| 178 | 0.047 | 16.5 |
| 193 | 0 | 16.5 |
| 206 | 0 | 16.1 |

[1] The brackets denote concentration of $CF_4$ in weight percent.
[2] The brackets denote concentration of $SF_6$ in weight percent.

Example 2

The procedure of Example 1 was used except that 215 g of CPG activated carbon, available from Calgon Corp., were used as the adsorbent. The results are shown on Table 2.

TABLE 2

| Time (min) | $[CF_4]$ | $[SF_6]$ |
|---|---|---|
| Feed | 0.6129 | 19.93 |
| 10 | 0 | 1.16 |
| 25 | 0 | 1.58 |
| 41 | 0 | 1.5 |
| 55 | 0 | 0.68 |
| 68 | 0 | 0.968 |
| 83 | 0 | 0.422 |
| 95 | 0 | 0.898 |
| 110 | 0 | 0.877 |
| 128 | 0 | 0.892 |
| 185 | 0.85278 | 0.804 |
| 197 | 0.8135 | 1.374 |
| 211 | 0.07415 | 16.32 |
| 225 | 0.04538 | 19.1 |
| 237 | 0.03941 | 18.95 |

Example 3

The procedure of Example 1 was used except that 332 g silicalite were used as the adsorbent. The results are shown on Table 3.

TABLE 3

| Time (min) | $[CF_4]$ | $[SF_6]$ |
|---|---|---|
| Feed | 0.03743 | 19.84 |
| 5 | 0 | 8.21 |
| 20 | 0 | 0.78 |
| 40 | 0 | 0.169 |
| 54 | 0 | 0 |
| 69 | 0 | 0 |
| 80 | 0.496 | 0 |
| 129 | 0.061 | 31.9 |

Example 4

The procedure of Example 1 was used except that 226 g F-400 activated carbon, available from the Calgon Corp., were used as the adsorbent. The results are shown on Table 4.

TABLE 4

| Time (min) | $[CF_4]$ | $[SF_6]$ |
|---|---|---|
| Feed | 0.03812 | 30.64678 |
| 4 | 0 | 8.09 |
| 19 | 0 | 0.904 |
| 32 | 0 | 1.65 |
| 45 | 0 | 1.1 |
| 90 | 0 | 0.404 |
| 103 | 0 | 0 |
| 117 | 0 | 0 |
| 131 | 0 | 0 |
| 145 | 0 | 0 |
| 160 | 0 | 0 |
| 174 | 0.047 | 0 |
| 187 | 0.269 | 0 |
| 200 | 0.493 | 0 |
| 213 | 0.212 | 0 |
| 224 | 0.189 | 0 |
| 238 | 0.081 | 50.55 |
| 255 | 0.037 | 29.03 |

Example 5

The procedure of Example 1 was used except that 225 g PCB activated carbon, available from Calgon Corp., were used as the adsorbent. The results are shown on Table 5.

TABLE 5

| Time (min) | [CF$_4$] | [SF$_6$] |
| --- | --- | --- |
| Feed | 0.02678 | 16.93 |
| 4 | 0 | 3.564 |
| 16 | 0 | 0.993 |
| 30 | 0 | 1.37 |
| 43 | 0 | 0.886 |
| 58 | 0 | 0.181 |
| 74 | 0 | 0.36 |
| 86 | 0 | 0.095 |
| 100 | 0 | 0.277 |
| 115 | 0 | 0.065 |
| 156 | 0 | 0 |
| 170 | 0 | 0 |
| 185 | 0 | 0 |
| 200 | 0 | 0 |
| 215 | 0 | 0 |
| 227 | 0 | 0 |
| 240 | 0.198 | 0 |
| 253 | 0.849 | 0 |
| 265 | 0.221 | 0.145 |
| 282 | 0.027 | 16.6 |

Example 6

The procedure of Example 1 was used except that 346.8 g 5 A zeolite, available from UOP Inc., were used as the adsorbent. The results are shown on Table 6.

TABLE 6

| Time (min) | [CF$_4$] | [SF$_6$] |
| --- | --- | --- |
| Feed | 0.03629 | 18.784 |
| 4 | 0 | 2.099 |
| 20 | 0 | 7.981 |
| 47 | 0 | 16.794 |
| 61 | 0 | 16.805 |

Example 7

The procedure of Example 1 was used except that 287 g ASC activated carbon, available from Calgon Corp., were used as the adsorbent. The results are shown on Table 7.

TABLE 7

| Time (min) | [CF$_4$] | [SF$_6$] |
| --- | --- | --- |
| Feed | 0.02967 | 18.25573 |
| 4 | 0 | 5.225 |
| 196 | 0 | 2.181 |
| 32 | 0 | 1.173 |
| 52 | 0 | 0.2084 |
| 77 | 0 | 0.3609 |
| 101 | 0 | 0.2848 |
| 110 | 0.02856 | 0 |
| 129 | 0.449 | 0 |
| 142 | 0.204 | 0 |
| 155 | 0.652 | 0 |
| 170 | 0.062 | 13.59 |
| 190 | 0.027 | 17.52 |

Example 8

The column of Example 1 was used and filled with 225 g dry PCB activated carbon, available from Calgon Corp. The feed gas stream, prepared by mixing a stream of air flowing at 400 mL/min and a stream of SF$_6$ contaminated with 2.25% CF$_4$ flowing at 100 mL/min, was allowed to pass through the column at a temperature of 25° C. The pressure in the column was adjusted to 248–265 psia. Samples of the gas stream exiting the column were taken periodically and analyzed by GC. The results are shown on Table 8. The capacity for the adsorbent for SF$_6$ was calculated from the time required for the SF$_6$ concentration to reach 50% of its feed concentration.

As can be seen, the CF$_4$ broke through the column before the SF$_6$ and its concentration exceeds its feed concentration at the time of breakthrough. It is theorized that this indicates that the adsorbent had a stronger affinity for SF$_6$ than for CF$_4$. By choosing the appropriate time for which to operate the column in the adsorption mode before regeneration of the SF$_6$, it is possible to displace essentially all of the CF$_4$ leaving the column loaded with only SF$_6$. This allows CF$_4$-free SF$_6$ to be harvested from the column during regeneration.

TABLE 8

| Cumulative Time (min) | Cumulative Vol. Feed (L) | % CF$_4$ | % SF$_6$ | Feed % CF$_4$ | Feed % SF$_6$ |
| --- | --- | --- | --- | --- | --- |
| Feed | 0 | — | — | 0.5698 | 23.372 |
| Feed | 0 | — | — | 0.4836 | 22.413 |
| 91.00 | 20.02 | 0 | 0.3078 | — | — |
| 117.00 | 25.74 | 0 | 0.1838 | — | — |
| 144.00 | 31.68 | 0 | 0 | — | — |
| 165.00 | 36.30 | 0 | 0 | — | — |
| 190.00 | 41.80 | 0 | 0 | — | — |
| 213.00 | 46.86 | 0.9923 | 0 | — | — |
| 236.00 | 51.92 | 2.8433 | 0 | — | — |
| 268.00 | 58.96 | 0.2606 | 16.134 | — | — |

Example 9

The column of Example 1 was filled with 275 g dry, 13× zeolite. A feed gas stream, prepared by mixing a stream of air flowing at 400 mL/min and a stream of SF$_6$ contaminated with 0.091% CF$_4$ flowing at 100 mL/min, was allowed to pass through the column at a temperature of 25° C. The column pressure was adjusted to 248–265 psia. Samples of the exiting gas stream were taken periodically and analyzed by GC. The results are shown in Table 9 on which the SF$_6$ concentrations are listed.

Once the SF$_6$ had broken through, the column was allowed to vent to an internal pressure of 760 torr (14.7 psia) for one hour. The column was again used to purify the same SF$_6$/air stream and monitored in the same way, the results of which are also found on Table 9. The column then was again vented, this time for hours, and again used to purify the same stream. After breakthrough was again observed, the column was reduced in internal pressure to 27 torr (0.52 psia) using a vacuum pump for one hour. The column was again used to purify the same stream during which the SF$_6$ concentration initially was much lower and the time required for breakthrough longer. In the same way, regeneration experiments were run at 1.25 and 3.5 hours. This example demonstrates that better regeneration of the adsorbent is obtained with the use of lower pressures.

TABLE 9

| Time (min) | Fresh 13X | 1 h at 760 torr | 20 h at 760 torr | 1 h at 27 torr | 1.25 h at 27 torr | 3.5 h at 27 torr |
| --- | --- | --- | --- | --- | --- | --- |
| 15 | 0.8 | — | — | — | — | — |
| 25 | 0.48 | — | — | — | — | — |
| 40 | 0.24 | — | — | — | — | — |

TABLE 9-continued

| Time (min) | Fresh 13X | 1 h at 760 torr | 20 h at 760 torr | 1 h at 27 torr | 1.25 h at 27 torr | 3.5 h at 27 torr |
|---|---|---|---|---|---|---|
| 60 | 0.23 | — | — | — | — | — |
| 75 | 0.19 | — | — | — | — | — |
| 90 | 0.17 | — | — | — | — | — |
| 100 | 0.21 | — | — | — | — | — |
| 120 | 0.19 | — | — | — | — | — |
| 130 | 0.18 | — | — | — | — | — |
| 150 | 0.2 | — | — | — | — | — |
| 160 | 0.17 | — | — | — | — | — |
| 180 | 16.5 | — | — | — | — | — |
| 190 | 16.46 | — | — | — | — | — |
| 210 | 16.12 | — | — | — | — | — |
| Break | 0.17 | — | — | — | — | — |
| 70 | — | 6.97 | — | — | — | — |
| 50 | — | 7.95 | — | — | — | — |
| 30 | — | 10.41 | — | — | — | — |
| 15 | — | 13.41 | — | — | — | — |
| 25 | — | — | 12.61 | — | — | — |
| 25 | — | — | 12.61 | — | — | — |
| 40 | — | — | 10.43 | — | — | — |
| 40 | — | — | 10.43 | — | — | — |
| 50 | — | — | 8.53 | — | — | — |
| 50 | — | — | 8.53 | — | — | — |
| 65 | — | — | 18.03 | — | — | — |
| 65 | — | — | 18.03 | — | — | — |
| 80 | — | — | 18.57 | — | — | — |
| 80 | — | — | 18.57 | — | — | — |
| 15 | — | — | — | 1.53 | — | — |
| 70 | — | — | — | 1.47 | — | — |
| 85 | — | — | — | 1.47 | — | — |
| 100 | — | — | — | 1.47 | — | — |
| 110 | — | — | — | 15.06 | — | — |
| 120 | — | — | — | 17.38 | — | — |
| 20 | — | — | — | — | 1.08 | — |
| 30 | — | — | — | — | 1.2 | — |
| 45 | — | — | — | — | 3.36 | — |
| 60 | — | — | — | — | 1.23 | — |
| 70 | — | — | — | — | 3.69 | — |
| 85 | — | — | — | — | 1.23 | — |
| 100 | — | — | — | — | 3.41 | — |
| 110 | — | — | — | — | 1.24 | — |
| 120 | — | — | — | — | 1.25 | — |
| 140 | — | — | — | — | 15.5 | — |
| 150 | — | — | — | — | 16.6 | — |
| 160 | — | — | — | — | 17.3 | — |
| 180 | — | — | — | — | 17.1 | — |
| 190 | — | — | — | — | 17.2 | — |
| 15 | — | — | — | — | — | 0.458 |
| 30 | — | — | — | — | — | 0.497 |
| 75 | — | — | — | — | — | 0.515 |
| 50 | — | — | — | — | — | 0.53 |
| 95 | — | — | — | — | — | 0.53 |
| 130 | — | — | — | — | — | 1.729 |
| 120 | — | — | — | — | — | 1.775 |
| 150 | — | — | — | — | — | 7.194 |
| 160 | — | — | — | — | — | 16.97 |
| 180 | — | — | — | — | — | 17.52 |

Example 10

The column of Example 1 was filled with 222 g dry PCB activated carbon. A feed gas stream, prepared by mixing a stream of air flowing at 400 mL/min and a stream of $SF_6$ contaminated with 0.091% $CF_4$ flowing at 100 mL/min, was allowed to pass through the column at a temperature of 25° C. The pressure in the column was adjusted to 248–265 psia. Samples of the exit gas were taken periodically and analyzed by GC. The adsorbent capacity for $SF_6$ was calculated from the time required for the $SF_6$ concentration to reach 50% of its feed concentration. The pre-breakthrough concentration of $SF_6$ was calculated by averaging the concentrations of $SF_6$ for all samples taken before breakthrough.

The column was then regenerated by reducing it in pressure to 43 torr (0.83 psia) using a vacuum pump at room temperature for 16 hours. The column was then re-used in the same way as above. The column was alternately used for adsorption and regenerated for a total of twelve cycles. The capacities and pre-breakthrough concentrations of $SF_6$ are shown on Table 10. No significant deterioration in performance was observed.

TABLE 10

| Regeneration Number | Capacity | Pre-breakthrough Concentration (% $SF_6$) |
|---|---|---|
| Fresh | 596 | — |
| 1 | 604 | 0.24707 |
| 2 | 624 | 0.24638 |
| 3 | 564 | 0.23068 |
| 4 | 586 | 0.25699 |
| 5 | 553 | 0.25105 |
| 6 | 597 | 0.27282 |
| 7 | 608 | 0.25235 |
| 8 | 549 | 0.20434 |
| 9 | 622 | 0.19294 |
| 10 | 580 | 0.19467 |
| 11 | 582 | 0.28268 |
| 12 | 586 | 0.21974 |

Example 11

A 500 mL (14 in×1.814 in i.d.) column is filled with activated carbon. A feed gas stream is prepared by mixing a stream of air flowing at 400 mL/min and a stream of sulfur hexafluoride, contaminated with 0.091% carbon tetrafluoride, flowing at 100 mL/min, is allowed to pass through this column at 40° C. The pressure in the column is adjusted to approximately 248–265 psia. Samples of the gas stream exiting this column are taken periodically and analyzed by GC. Results are observed comparable to those of Example 1.

Example 12

A 500 mL (14 in×1.814 in i.d.) column is filled with activated carbon. A feed gas stream is prepared by mixing a stream of air flowing at 400 mL/min and a stream of sulfur hexafluoride, contaminated with 0.091% carbon tetrafluoride, flowing at 100 mL/min, is allowed to pass through this column at 25° C. The pressure in the column is adjusted to approximately 100×200 psia. Samples of the gas stream exiting this column are taken periodically and analyzed by GC. Results are observed comparable to those of Example 1.

What is claimed is:

1. A process for recovering sulfur hexafluoride comprising the step of contacting a gas stream comprising a minor amount of sulfur hexafluoride with an adsorbent capable of selectively adsorbing sulfur hexafluoride under conditions suitable for the selective adsorption of the sulfur hexafluoride from the gas stream.

2. The process of claim 1 in which the gas stream comprises the minor amount of sulfur hexafluoride and at least one component selected from the group consisting of air, carbon tetrafluoride, argon, helium, carbon monoxide, carbon dioxide, nitrogen, oxygen, neon, and hydrogen.

3. The process of claim 2 wherein the gas stream comprises the minor amount of sulfur hexafluoride and the at least one component is air and carbon tetrafluoride.

4. The process of claim 1 wherein the minor amount of sulfur hexafluoride is less than about 50 volume percent of the gas stream.

5. The process of claim 1 wherein the minor amount of sulfur hexafluoride is less than about 20 volume percent of the gas stream.

6. The process of claim 1 wherein the adsorbent is selected from the group consisting of zeolites, activated carbons, and silicalites.

7. The process of claim 1 wherein the adsorbent is a zeolite.

8. The process of claim 7 wherein the zeolite is sodium X (13×) zeolite.

9. The process of claim 1 wherein the adsorbent is an activated carbon having a mesh of from about 4 to about 300.

10. The process of claim 1 wherein the contacting of the gas stream and adsorbent takes place at a gas hourly space velocity less than about 240 h$^{-1}$.

11. The process of claim 1 wherein contacting of the gas stream and adsorbent is performed at a temperature and a pressure such that the temperature is greater than about the boiling point of sulfur hexafluoride at the pressure.

12. The process of claim 11 wherein the temperature is from about 10° to about 40° C. and the pressure is at least about 100 psia.

13. The process of claim 1 further comprising the step of regenerating the sulfur hexafluoride selectively adsorbed.

14. A process for recovering sulfur hexafluoride comprising the step of contacting a gas stream comprising less than about 50 volume percent sulfur hexafluoride and at least one component selected from the group consisting of air, carbon tetrafluoride, argon, helium, carbon monoxide, carbon dioxide, nitrogen, oxygen, neon, and hydrogen with an adsorbent selected from the group consisting of zeolites, activated carbons, and silicalites, the contacting carried out at a temperature from about 10° to about 40° C. and a pressure at least about 100 psia, the temperature and pressure such that the temperature is above the boiling point of the sulfur hexafluoride for the contacting pressure, and at a gas hourly space velocity of less than about 240 h$^{-4}$.

15. The process of claim 14 wherein the at least one component is selected from the group consisting of air and carbon tetrafluoride.

16. The process of claim 14 wherein the sulfur hexafluoride is present in an amount of less than about 20 volume percent of the gas stream.

17. The process of claim 14 wherein the adsorbent is a zeolite.

18. The process of claim 17 wherein the zeolite is sodium X (13×) zeolite.

19. The process of claim 17 further comprising the step of regenerating the sulfur hexafluoride recovered by lowering the pressure to about 14.7 psia and at a temperature of at least about 10° C.

20. The process of claim 14 wherein the adsorbent is an activated carbon having a mesh of from about 4 to about 300.

21. A process for recovering sulfur hexafluoride comprising the steps of:

contacting a gas stream comprising less than about 20 volume percent sulfur hexafluoride and at least one component selected from the group consisting of air, carbon tetrafluoride, argon, helium, carbon monoxide, carbon dioxide, nitrogen, oxygen, neon, and hydrogen with an adsorbent selected from the group consisting of zeolites, activated carbons, and silicalites, the contacting carried out at a temperature from about 25° to about 40° C. and a pressure at least about 100 psia, the temperature and pressure such that the temperature is above the boiling point of the sulfur hexafluoride for the contacting pressure, and at a gas hourly space velocity of less than about 240 h$^{-1}$; and regenerating the sulfur hexafluoride recovered by lowering the pressure to about 14.7 psia and at a temperature of at least about 10° C.

22. The process of claim 21 wherein the sulfur hexafluoride is present in an amount of about 1 volume percent.

23. The process of claim 21 wherein the at least one component is selected from the group consisting of carbon tetrafluoride and air.

24. The process of claim 21 wherein the adsorbent is sodium X(13×) zeolites.

25. The process of claim 21 wherein the activated carbon is an activated carbon having a mesh of from about 4 to about 400.

* * * * *

UNITED STATES PATENT AND TRADEMARK OFFICE
CERTIFICATE OF CORRECTION

PATENT NO : 5,720,797
DATED : February 24, 1998
INVENTOR(S) : Yates et al.

It is certified that error appears in the above-identified patent and that said Letters Patent are hereby corrected as shown below:

Column 5, line 26, "5 A" should read -- 5A --.

Column 6, line 49, after "for", insert -- 20 --.

Column 8, line 43, "100 x 200" should read -- 100 – 200 --.

Column 9, line 35 (Claim 14, line 13), delete "$^{-4}$" and substitute -- $^{-1}$ -- therefor.

Signed and Sealed this

Fifteenth Day of February, 2000

Q. TODD DICKINSON

*Attest:*

*Attesting Officer*   *Commissioner of Patents and Trademarks*